March 18, 1924.
A. B. FELDMAR
1,487,053
FIXING BLOCKS FOR MASONRY
Filed Feb. 2, 1922
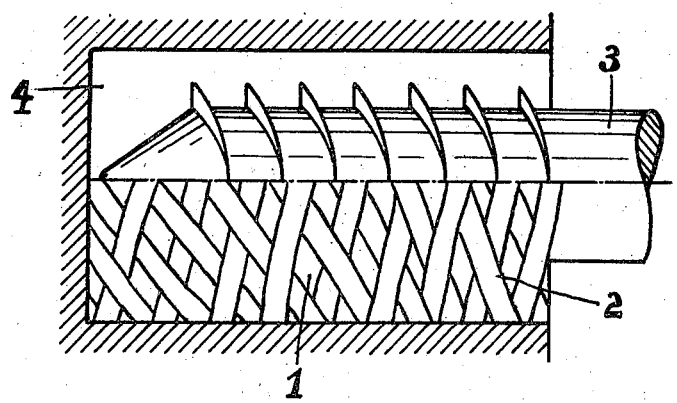
Witnesses:
Inventor:

Patented Mar. 18, 1924.

1,487,053

UNITED STATES PATENT OFFICE.

ADALBERT BÉLA FELDMAR, OF BERLIN, GERMANY.

FIXING BLOCKS FOR MASONRY.

Application filed February 2, 1922. Serial No. 533,698.

*To all whom it may concern:*

Be it known that I, ADALBERT BÉLA FELDMAR, a citizen of Hungary, and residing at 8 Regensburgerstrasse, Berlin W. 50, Germany, have invented certain new and useful Fixing Blocks for Masonry, of which the following is a full, clear, and exact description.

The present invention relates to an improved method of fixing screws, nails, hooks and the like in stone, marble, glass and similar materials, and consists of the details hereinafter more fully described.

According to the known method the material such, for instance, as stone, marble, glass or the like in which screws, nails or the like are to be fixed is suitably bored out, and into the boring a tubular insertion is placed. Into this insertion, preferably into the boring of the same, the screw, nail, hook or the like is screwed or driven, whereby the material of the tubular insertion is pressed against the sides of the boring, filling out the hollow space, so that the screw or the like is held by adhesion and pressure. The tubular-shaped sleeves or insertions already known consist of single parallelly arranged strands, which are held together by a binding means. These insertions possess the disadvantage that already before being used, by transport and upon contact, they easily fall apart, as the single strands are merely held together by the binding means. If a nail or a screw is inserted into such a sleeve than a splitting of the sleeve occurs, and the single strands can move about against one another. The single strands become independent of one another and fall out of the wall work, so that a firm hold is absolutely not to be attained. This disadvantage is removed by the invention. According to the invention the tubular insertion, which consists of impregnated artificial silk, artificial horse hair, glass threads or the like, is produced with the threads interlaced or plaited together. The advantage of using this sort of insertion consists in the fact that the tubular insertion becomes flexible and elastic and that the interlaced strands are movable against one another so that the insertion will be stretched or pressed together, whereby the diameter of same is increased or decreased accordingly. By the increase or decrease of the diameter proper distribution of the strength of the insertion all over the width of the boring in the stone or the like is assured. Another advantage of the interlaced tubular insertion consists in that upon inserting, for instance, a screw, the threads of the insertion are caught up and drawn into the thread of the screw, so that the insertion is shortened and its diameter increased, whereby the pressure in the boring is increased. If a nail or hook is inserted into such an interlaced tubular insertion the latter will be stretched and shortened owing to the increase of diameter. The tubular insertion completely encompasses the thread of the screw on the shaft of the nail or hook on the one hand, and on the other hand is pressed perfectly against the sides of the boring, filling out the hollow space, so that the screw or the like is held firmly by extraordinary adhesion and pressure.

Reference is had to the accompanying drawings in which

Fig. 1 shows a view of the interlaced tubular insertion.

Fig. 2 shows partly in section on a larger scale the tubular insertion with an inserted screw in the wall work.

According to the invention 1 is the tubular insertion, interlaced from artificial silk threads, artificial horse hair, glass threads or the like. For the material artificial silk, artificial horse hair, glass threads and the like are chosen for the reason that these materials possess an essentially greater friction co-efficiency to the wall work, etc., than other materials. The threads are produced in the customary manner, and rendered for the present purpose specially durable by impregnating. Furthermore, the above-mentioned materials have the advantage that they possess a greater mechanical strength against the influence of humidity, acids, damp and the like. The plaiting or knitting of the threads brings them into a firm connection with one another without the fact that the expansibility and elasticity of the tubular insertion upon the insertion of the screw etc. becomes prejudiced. The tubular insertion remains thereby always in a whole condition, and is not destroyed by using. Single strands can never move independently of the other, or fall out. A further property of the interlacing or plaiting is that the single threads 2 of the tubular insertion retain a certain movability in their collectiveness, so that the insertion may be easily stretched or pressed together, whereby the threads move in the axial direction of the skein and take up a position practically at right angles thereto respectively. Upon stretching the insertion this becomes thinner, by pressing together it becomes thicker. The present invention makes use of this property of the insertion. If a screw 3 is inserted into the interlaced tubular insertion 1 in the opening 4 in the wall (Fig. 2) the tubular insertion is not only broadened out and the threads between the screw and the sides of the boring pressed together, but the thread of the screw also picks up the individual threads of the tubular insertion material in such a way that they then lie within the thread of the screw. In other words the threads are displaced from their position in the axial direction of the tubular insertion into a position at right angles to same (Fig. 2). This brings about, as explained above, a shortening and therefore a thickening of the tubular insertion with the effect that exactly as a result of this thickening an extraordinary pressure of the tubular insertion against the sides of the opening in the wall is attained. The thickening of the tubular insertion in addition to the broadening out which would otherwise occur upon the insertion of the screw leads to a connection of the screw with the wall work possessing indestructible strength, for upon the insertion of the screw the thread of the screw in no way cuts the tubular insertion, but merely a displacement of the strands in the thread of the screw occurs, whereby the tubular insertion remains undamaged. Also for the fixing of nails, hooks and the like the tubular insertion according to the present invention is specially advantageous in so far as the broadening out of the tubular insertion by the displacement of the strands into a position practically at right angles to their original position occurs, a tearing of the tubular insertion by the insertion of the nail, etc., being thereby avoided.

I claim as my invention:—

1. The combination with a stone, marble, glass or the like foundation having an aperture therein, of an elastic and flexible tubular insertion arranged in said aperture and consisting of interlaced strands of fibrous material adapted to receive a screw, nail or the like.

2. A combination as claimed in claim 1 in which the strands are impregnated.

3. The combination with a wall of stone, marble, glass or the like provided with an aperture, of a flexible sleeve-like tubular insertion arranged in said aperture and consisting of interlaced strands of fibrous material, the outer surface of said insertion snugly engaging the surface of the wall of said aperture, and a fastening element having a shank snugly engaging the inner surface of said insertion.

In testimony whereof I have affixed my signature in the presence of two witnesses.

ADALBERT BÉLA FELDMAR.

Witnesses:
RICHARD GEISSLER,
OTTO WACLWOWIUS.